United States Patent [19]

Geel et al.

[11] 4,414,110

[45] Nov. 8, 1983

[54] SEALING FOR A HOLLOW FIBER SEPARATORY DEVICE

[75] Inventors: Zane H. Geel, Concord; Roger B. Hornby; Bennie J. Lipps, both of Walnut Creek; Charles E. Savage; Pierre Vanat, both of Clayton, all of Calif.

[73] Assignee: Cordis Dow Corp., Miami, Fla.

[21] Appl. No.: 223,964

[22] Filed: Jan. 12, 1981

Related U.S. Application Data

[63] Continuation of Ser. No. 39,087, May 14, 1979, abandoned.

[51] Int. Cl.³ .............................................. B01D 31/00
[52] U.S. Cl. ............................... 210/321.3; 210/323.2; 210/450; 210/456; 422/48
[58] Field of Search .............. 210/244, 247, 450, 456, 210/541, 321, 323.2, 433.2, 497.01; 285/177; 55/16, 158; 422/48; 128/214 R, DIG. 3; 138/89

[56] References Cited

U.S. PATENT DOCUMENTS

| | | | |
|---|---|---|---|
| 2,311,708 | 2/1943 | Sundholm | 285/177 |
| 2,507,535 | 5/1950 | Madsen | 285/177 |
| 3,339,341 | 9/1967 | Maxwell et al. | 55/16 |
| 3,832,830 | 9/1974 | Gerow | 55/158 |
| 4,001,110 | 1/1977 | Geen et al. | 210/321 X |
| 4,125,468 | 11/1978 | Joh et al. | 210/321 |

*Primary Examiner*—David R. Sadowski
*Attorney, Agent, or Firm*—Neal A. Waldrop; Jay C. Taylor

[57] ABSTRACT

A hollow fiber medical separatory device of the type including a shell containing a plurality of hollow semipermeable fibers extending through a central dialysate chamber and terminating in spaced apart blood chambers; the device is improved by tubesheets at each end of the fibers having the shape of a frustum of a cone and sized such that the fibers fill the cone to the peripheral edge at the outer end planar surface of the frustum; and a multi-functional blood chamber means forming a blood chamber by pressure sealing engagement with the outer tapered surface of the cone and also pressure sealed to the outer end surface of the shell to prevent air ingress into the dialysate chamber during testing or use.

The invention also includes a method for potting the frusto-conical tubesheets on the end portions of the fibers while the fibers are positioned in the shell which is improved by the use of steps and means to insure centering of the fibers in the cone during centrifugal casting of the resin.

13 Claims, 14 Drawing Figures

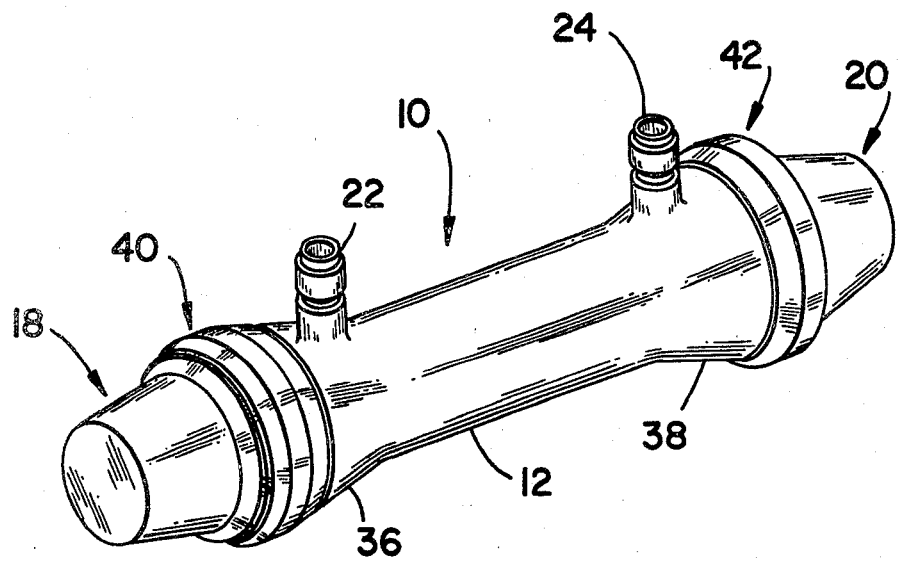
FIG_1
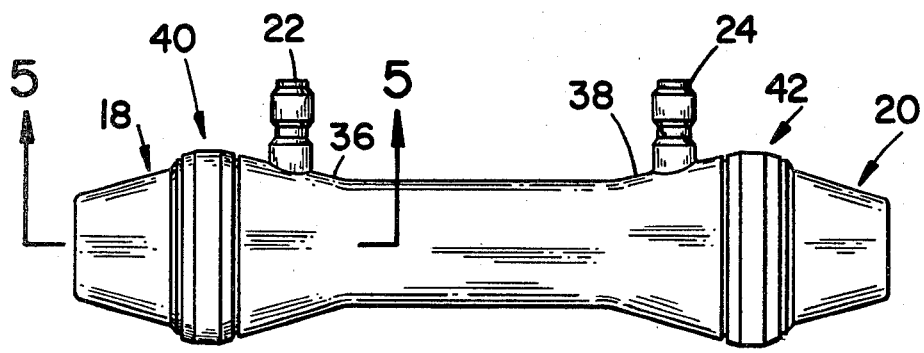
FIG_2

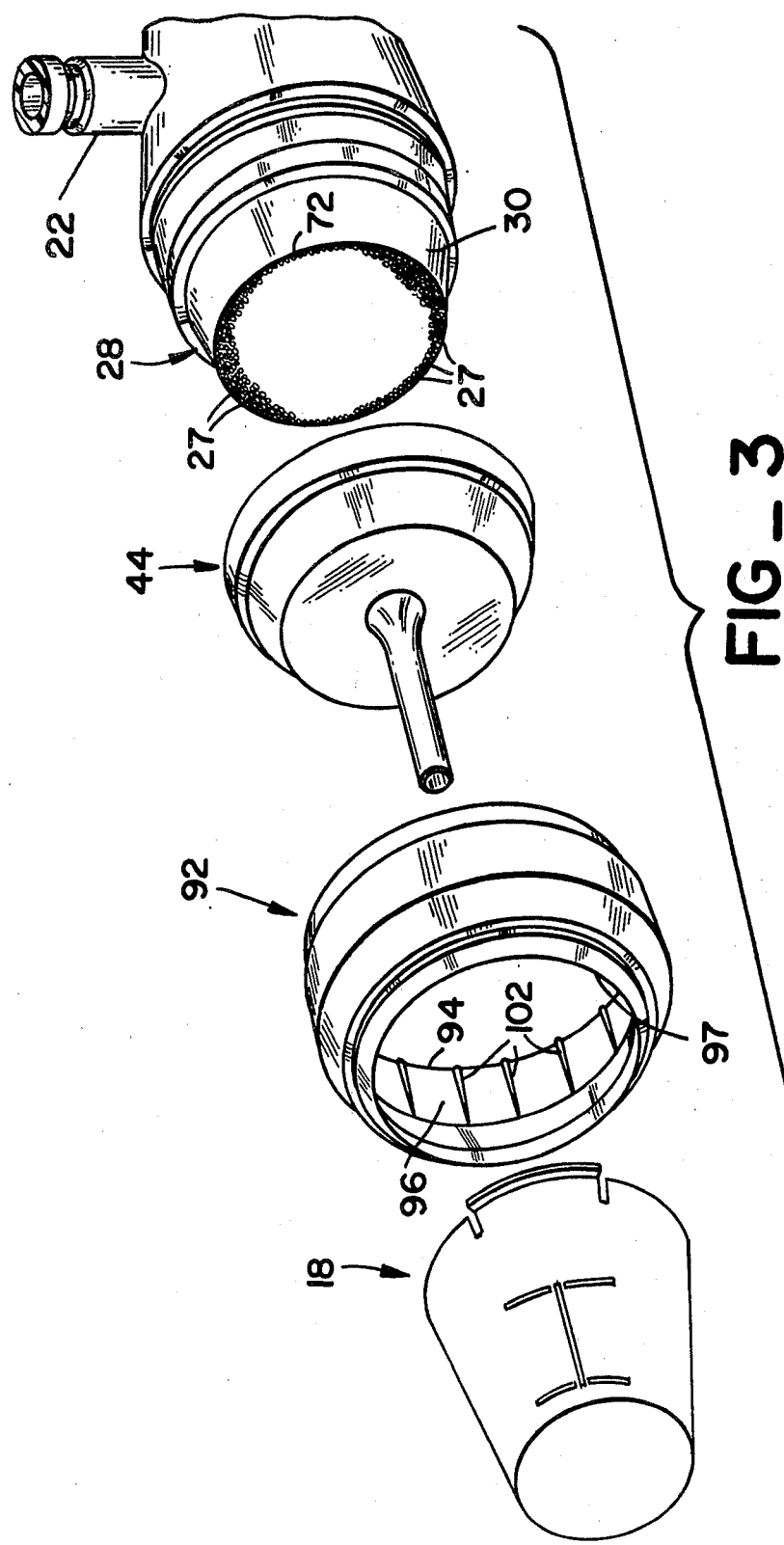

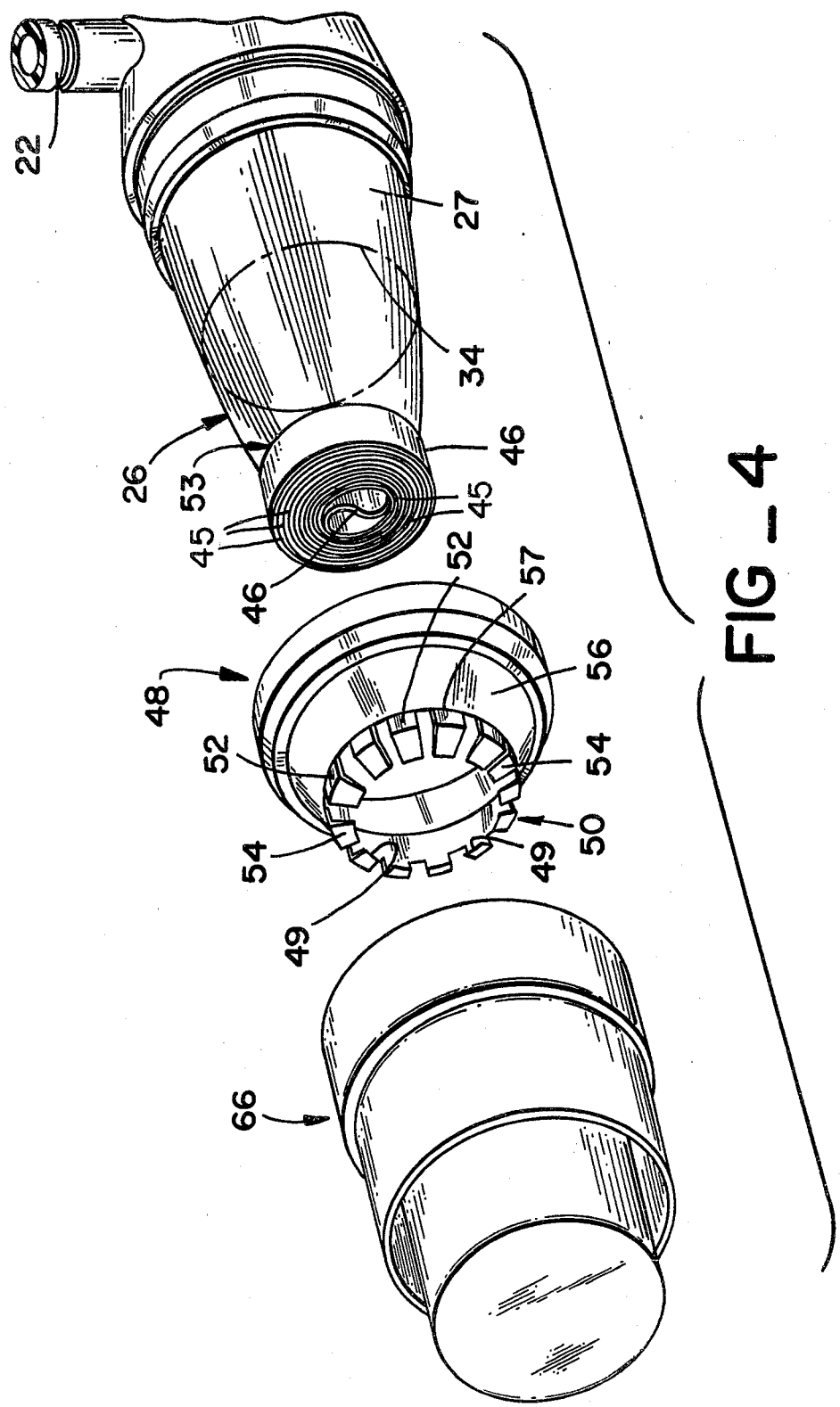

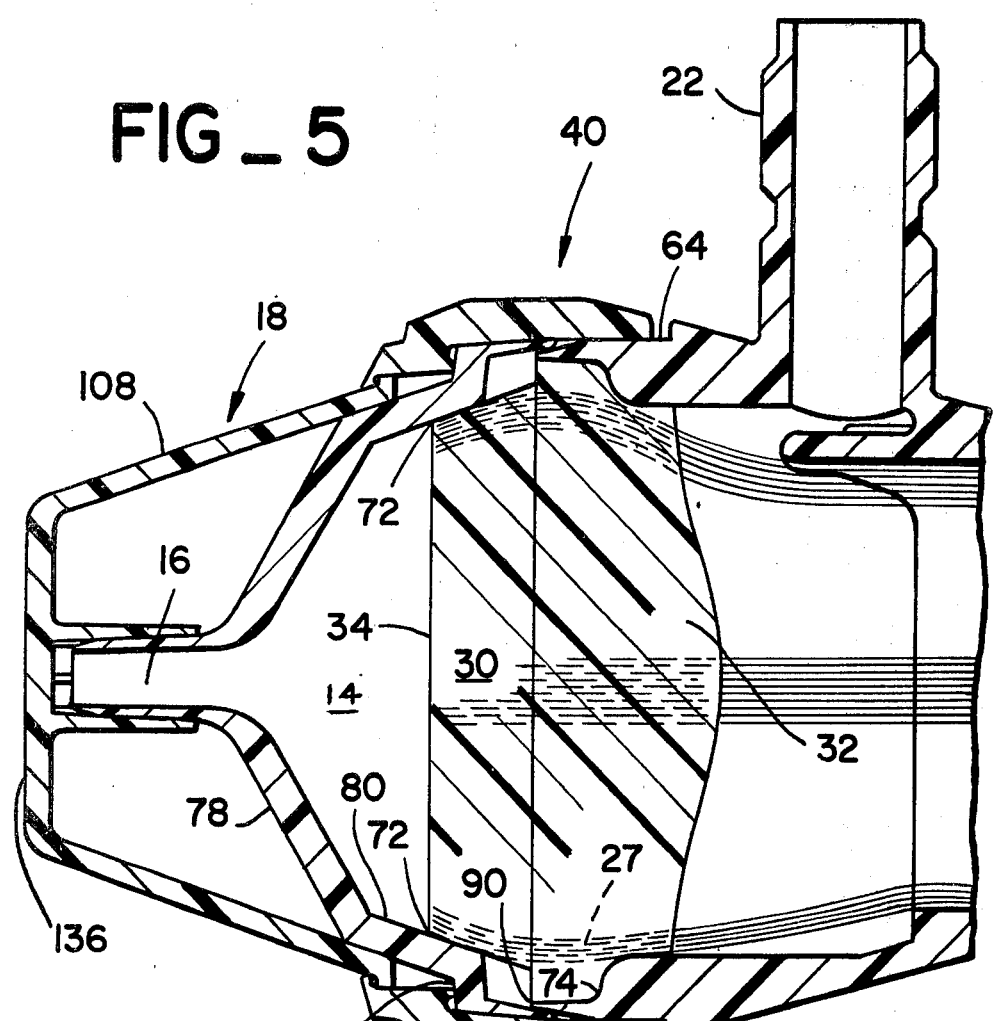

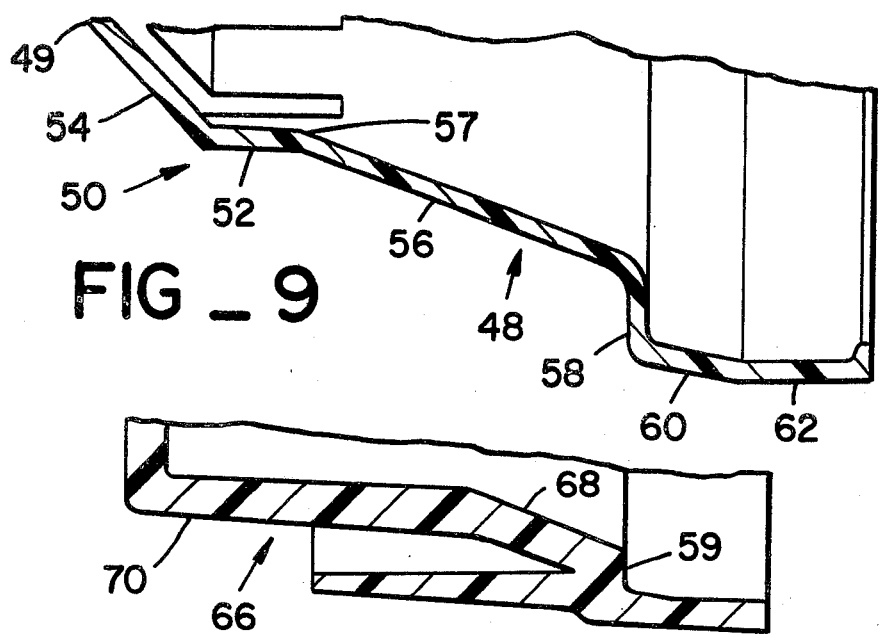
FIG_9
FIG_8
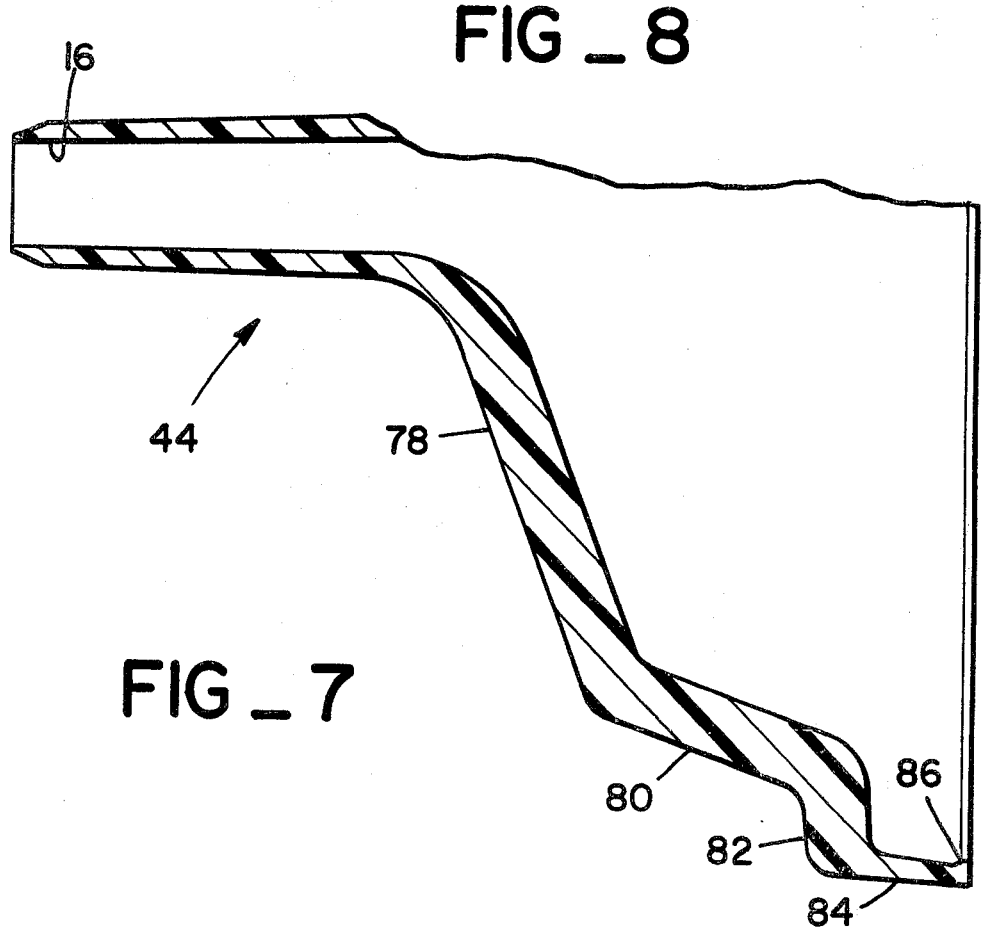
FIG_7

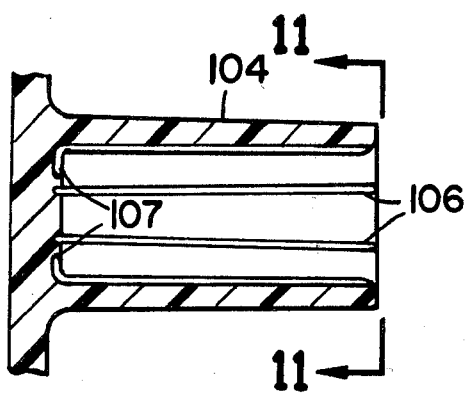
FIG_10
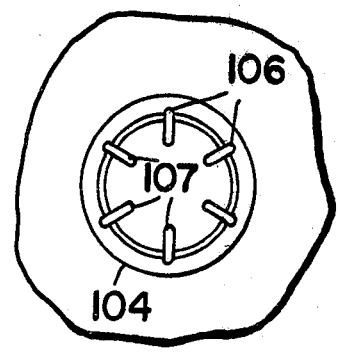
FIG_11
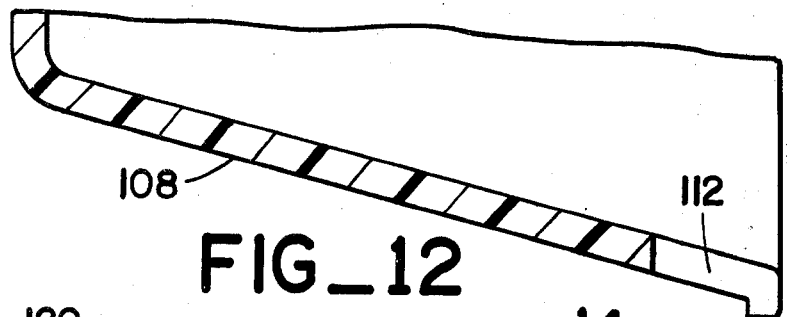
FIG_12
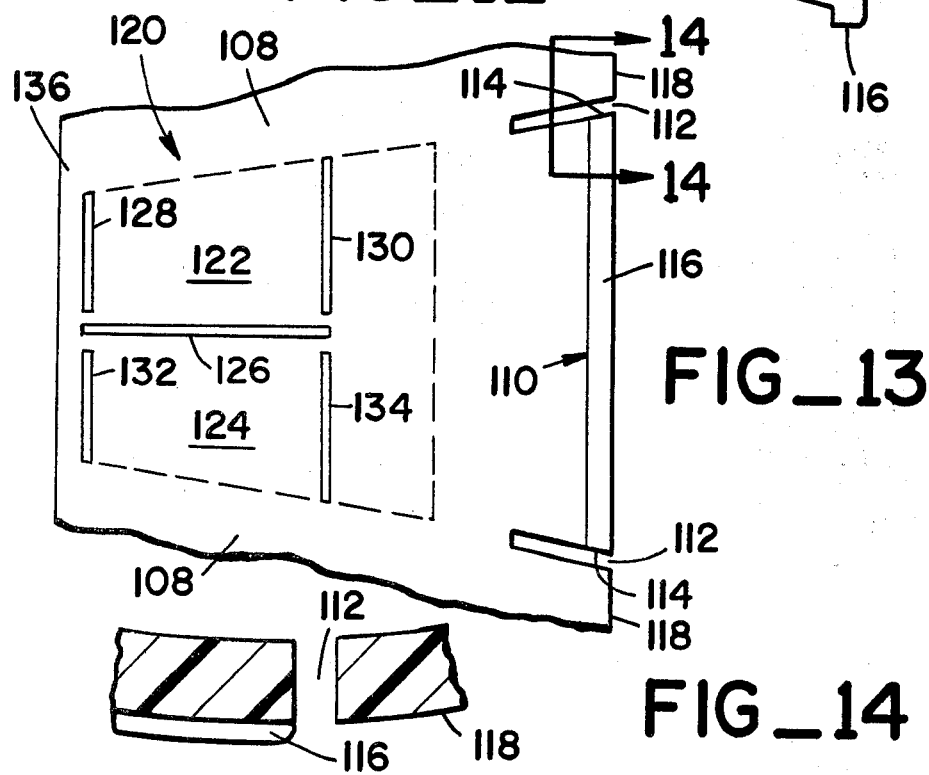
FIG_13
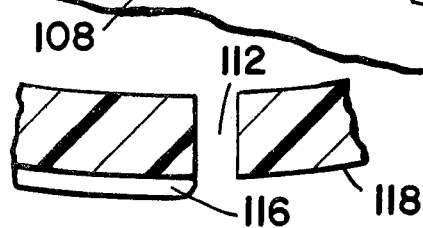
FIG_14

SEALING FOR A HOLLOW FIBER SEPARATORY DEVICE

This application is a continuation of co-pending application Ser. No. 039,087, filed May 14, 1979 abandoned.

BACKGROUND OF THE INVENTION

This invention relates to improvements in medical separatory devices, such as hollow fiber artificial kidneys, utilizing the type of hollow fiber bundle disclosed in Mahon U.S. Pat. No. 3,228,876.

Artificial kidneys employing a single Mahon-type bundle comprising thousands of semi-permeable cellulose or cellulose acetate hollow fibers, after commercial introduction in the United States by Cordis Dow Corp. in the late 1960's have experienced worldwide acceptance and the proportion of such kidneys in use has continuously increased since that time.

Commercial versions of such artificial kidneys having the general configuration of a tube-and-shell heat exchanger similar to that shown in U.S. Pat. No. 3,228,877 typically comprise a shell of about 4" to 10" in length and 1½" to 4" in diameter and usually contain more than 5,000 and less than 25,000 individual hollow fibers. The shell is divided into two blood chambers which are spaced apart by an intervening dialysate chamber within which the hollow semi-permeable fibers, carrying blood in their interiors, are continuously bathed on their exterior surfaces by a dialysate solution. The fibers are secured to each other in a solidified resin tubesheet and the tubesheet, on each end of the fibers, serves to seal the blood chamber from the intervening dialysate chamber. The great majority of this type of artificial kidney have employed a cylindrical dialysate chamber integrally attached to end blood chambers, each having a larger diameter than the dialysate chamber, such as illustrated in U.S. Pat. Nos. 3,228,876; 3,228,877; and most particularly in FIG. 4 of U.S. Pat. No. 3,882,024. The tubesheets are typically formed by centrifugally casting a castable synthetic resin around the fibers while those fibers are positioned within the shell in such a manner that the solidified tubesheet assumes the cylindrical cross section of the enlarged blood chamber portion of the shell. Widely used fiber potting, or centrifugal casting, processes of this type are disclosed in U.S. Pat. Nos. 3,442,002 and 3,492,698. Another usable method is shown in U.S. Pat. No. 3,755,024.

An inherent advantage of centrifugally casting the supporting tubesheet directly in the kidney shell is that the tubesheet automatically serves as the separating barrier between the dialysate and blood chambers. Moreover, this separating barrier concurrently forms a fluid tight seal between the dialysate and blood chambers and this seal results from the contact between the surface of the inner wall of the shell and the surface of the outer wall of the tubesheet at its rim. Ideally, the desired seal occurs due to adhesion between the selected castable resin and the shell as the tubesheet resin solidifies in that shell. In commercial manufacture by this method, multi-thousands of artificial kidneys have been made and used satisfactorily. However, care must be taken to select materials for the shell, the tubesheet and the hollow fibers which compatibly bind the fibers together in the tubesheet and concurrently maintain the necessary fluid tight seal between the shell and tubesheet under the variable temperature and pressure conditions encountered in transporting and using the kidneys for their intended purpose. Extensive research has been directed to the problems inherent in maintaining these vitally important seals. Epoxy type tubesheet compositions have been explored and identified in U.S. Pat. Nos. 3,619,459 and 3,703,962. Suitable permselective fibers are disclosed in 3,423,491, while polyurethane tubesheet compositions are disclosed in U.S. Pat. Nos. 3,362,921; 3,643,805; 3,708,071; and 3,962,094.

Notwithstanding the above research efforts, manufacturing difficulties remain due to the exacting tolerance requirements on the peripheral dimensions and on the uniformity of those dimensions on the individual elements to insure and maintain satisfactory sealing to meet manufacturing specifications or the actual conditions encountered during clinical use. One problem that has persisted results from the tendency of the hollow fibers to expand under use conditions, that is, when wet with blood internally, surrounded by tubesheet resin externally, and wet with dialysate on the external surfaces of the fibers immediately adjacent to the inner end of the tubesheet surface. It has been observed that such expansion may be sufficient to cause rupturing of the seal between the shell and the tubesheet rim. Similarly, rupture between the shell and tubesheet may result from unequal shrinkage of the tubesheet resin away from the inside shell wall during solidification, or a partial rupture may occur during testing or in use where the fibers are not centered in the tubesheet relative to the shell.

Another recurring problem encountered from time to time in commercial manufacture using centrifugal potting that produces a tubesheet containing off center fibers is that of clotting in stagnant zones on the tubesheet surface which exposes the open fiber ends to the blood pool in the blood chamber. The blood chamber is usually formed by a cup-shaped member which is sealed against the planar surface of the tubesheet by a conventional circular O-ring such as shown in FIG. 4 of U.S. Pat. No. 3,882,024. Where the hollow fibers extending through the tubesheet are off center a stagnant zone occurs in the out of round portion, or arcuate segment, encompassed by the circular O-ring. In that segment, the tubesheet surface is solid and no open ends of fibers are available to accept the blood and stagnation of the blood in that location over a portion of the hemodialysis treatment may cause clotting. In addition to the undesirable loss of blood to the patient, such clots are difficult to remove, or cleanse during backwashing in preparation for possible reuse of the kidney and, where not removed require discarding of the kidney.

The primary object of this invention is to provide an improved separatory device which overcomes the above described problem of failure in the tubesheet-shell seal.

A second important objective of this invention is to provide an improved artificial kidney device which eliminates the blood clotting problem caused by off center fibers in the tubesheet.

Another objective of this invention is to provide an improved method of centrifugally casting semi-permeable hollow fibers into a castable resin while those fibers are positioned in the artificial kidney shell which insures that the fibers remain centered in the tubesheet and extend to the peripheral surface of that tubesheet at its transverse planar surface which exposes the open fiber ends to the interior of the blood chamber.

SUMMARY OF THE INVENTION

The improved device or artificial kidney, includes a new tubesheet element having a frusto-conical, axially centered, fiber-containing portion, surrounded by a disc, or rim, portion free of fibers, and blood chamber means, or header, which overlies the frusto-conical portion in pressure sealing relationship with the peripheral surface adjacent the planar outer end of the frustum of the cone to thereby form a generally cup-shaped blood chamber.

The tubesheet rim or disc portion preferably forms and maintains during use a fluid and gas tight seal between the outer rim surface of the tubesheet and the inner wall of the shell; however, the blood chamber means, or header, includes axially inwardly extending portions integral with the blood chamber wall means and a second, or back-up, gas-tight seal is formed between these portions and the exterior end surface of the shell by pressure-tight contact therewith. These inwardly extending header portions isolate the internal tubesheet rim-shell seal from the blood chamber and the air outside the shell to thereby prevent ingress into the dialysate chamber in case of failure of the internal seal.

The frusto-conical portion of the tubesheet contains the centrally disposed hollow fibers which generally follow the external surface of the cone as they approach its outer planar surface which exposes the open end of each of the fibers. In other words, at the frusto-conical planar surface there is no rim of fiber-free solidified resin exterior of the profile of the outer surfaces of the fibers in the bundle, or substantially none.

The method of this invention comprises centrifugally casting a solidifiable castable resin in and around the ends of a bundle of hollow semipermeable fibers mounted in a shell and surrounded by end molds equipped with new, combination fiber-centering and frusto-conical tubesheet forming means. During the centrifugal casting of the resin in and around the fibers the combination means maintains the fibers centered throughout the casting process and the curing of the resin irrespective of forces tending to force the bundle of fibers off-center as the resin permeates therebetween. After curing, the solidified tubesheet is transversely severed at approximately the junction of the inner end of a centering portion and the outer end of the frusto-conical tubesheet forming portion of that combination means. The resultant severed tubesheet is the improved element described above.

BRIEF DESCRIPTION OF THE DRAWINGS

FIG. 1 is a perspective view of the improved device of this invention;

FIG. 2 is a side view of the device of FIG. 1;

FIG. 3 is an exploded schematic view of the device of FIG. 1 showing its component parts comprising, from right to left, the shell surrounding the integral frusto-conical tubesheet, the blood chamber means or header, slip ring sealing means and sterility blood port cap means;

FIG. 4 is an exploded schematic view showing the parts used in the centrifugal casting process prior to assembly and including, from right to left, the shell containing a fiber bundle, combination centering and frusto-conical tubesheet forming means, and end mold;

FIG. 5 is a vertical section of the device of FIG. 2 taken along the line 5—5 thereof;

FIG. 6 is an expanded view of the sealing elements shown on the bottom surface portion of FIG. 5;

FIG. 7 is an enlarged cross-sectional view of a portion of the blood chamber means, or header, illustrated schematically in FIG. 3;

FIG. 8 is a partial vertical cross-section of the end mold illustrated schematically in FIG. 4;

FIG. 9 is an enlarged cross-section of the combination centering and frusto-conical mold liner illustrated schematically in FIG. 4, and oriented relative to the end mold of FIG. 8 for emplacement therein prior to centrifugal casting;

FIG. 10 is an enlarged view of the blood port cap shown in FIG. 5;

FIG. 11 is a view of the cap of FIG. 10 looking in the direction of the arrows 11—11;

FIG. 12 is an enlargement of the wall section of the cap of FIG. 5;

FIG. 13 is a fragmentary view of the cap of FIG. 5 showing the tamper-proof access windows;

FIG. 14 is a sectional view showing distortable means adapted to facilitate assembly and taken along the line 14—14 of FIG. 13.

DETAILED DESCRIPTION OF THE INVENTION

The medical separatory device of FIG. 1 generally designated 10 is shown in the form of an artificial kidney of the hollow fiber type; it should be understood, however, that it is representative only of the separatory devices of this invention which include hemofilters, blood oxygenators or other separators of impurities from or injectors of other fluids or gases into blood or other body fluids. Device 10 comprises a centrally located dialysate chamber 12 intermediate, a pair of spaced apart blood chambers 14, FIG. 5, attached to each end thereof. Each blood chamber 14 terminates in an axially located blood port 16 which is covered by blood port cap means generally designated 18, 20. Dialysate chamber 12 is provided with conventional inlet and outlet dialysate ports 22, 24 and surrounds a bundle, generally designated 26, of axially extending hollow semipermeable fibers of the type disclosed in U.S. Pat. No. 3,228,876. Fiber bundle 26 contains thousands, for example, 3,000 to 30,000 and preferably 5,000 to 25,000 individual fibers which may be any of the now well known types including cellulose made by deacetylating cellulose acetate as taught in U.S. Pat. No. 3,546,209 or cellulose made by the cuprammonium process; alternatively the fibers may be cellulose acetate or other cellulose ester, or polyesters, or polyamides or other permselective fibers such as those described in U.S. Pat. Nos. 3,423,491 and 3,532,527. The fibers are fine and of capillary size which typically ranges from about 150 to about 300 microns internal diameter with a wall thickness in the range of about 20 to about 50 microns. The fibers 27 in bundle 26 extend into and through a pair of spaced apart tubesheets, generally designated 28. Tubesheets 28, as best seen in FIG. 5, differ importantly from tubesheets heretofore used in commercial hollow fiber artificial kidneys and constitute one of the key elements of improved device 10. Typical prior tubesheets were centrifugally cast and then severed transversely to form a disc-shaped element closing the outer ends of the shell and terminating in a flat face exposing the open ends of the fibers encapsulated in the solidified resin. The flat face of the tubesheet served as the inner surface of a generally cup-shaped blood chamber formed by placing an O-ring around the center portion of the face to expose the open fiber ends and pressure sealing a cup-shaped header on the O-ring. The important difference between such prior tubesheets and tubesheet 28 is the provision of a frusto-conical portion 30 attached to and integral with a disc portion 32 of conventional type. This conical portion 30 extends axially outwardly from disc 32 and terminates in a planar face 34 exposing fibers 27 across that surface and to the peripheral edge of frusto-conical portion 30, FIG. 3. Fibers 27 have a generally parallel, or spiral, orientation inside dialysate chamber 12 and flare slightly outwardly in the gently tapered portion 36, 38 which connects chamber 12 to end blood chambers generally designated 40 and 42; due to circumferential confinement of fibers 27 during centrifugal casting of the tubesheet, the fibers generally follow along the taper of portion 30 such that the profile, or external configuration, of the fiber bundle 26 is circular at face 34, as best seen in FIGS. 3 and 6.

Frusto-conical portion 30, and particularly its tapered outer surface is used in combination with blood chamber forming means, or header generally designated 44 to form, or define, blood cavity 14 in a manner that will be explained in greater detail following a description of the method of making tubesheets 28.

The method of making tubesheets 28 of this invention may be best understood by referring to FIGS. 4 and 5. Fiber bundle 26 is initially formed on a conventional beltwinder by known procedures such as described in U.S. Pat. No. 3,755,034, and as so formed the individual fibers 27 are gathered in a plurality of spirally oriented annular layers 45 and secured tightly by band means 46 which may be nylon or polypropylene tape, into a smaller diameter planar end portion, which is equally representative of both ends of the bundle, FIG. 4.

The shell of device 10 is separately formed by conventional molding techniques from any of a number of medically approved resins such as clear polystyrene, impact polystyrene, polypropylene, polyacrylates, etc., and its fabrication is not a part of the novel features of this invention. Although the shell or jacket of device 10 and the enlarged end blood chambers 40, 42 are, as illustrated, circular in cross section it is to be understood that other shapes are equally useful and suitable including lenticular, elliptical or other curvilinear cross sections adapted to enclose or nest various tubesheet configurations such as, for example, those shown in Tigner U.S. Pat. No. 4,138,460 in FIGS. 3 and 6-10 inclusive.

The first step in the method of making tubesheet 28 is to thread, or insert, bundle 26 into the elongated shell of FIG. 1 such that bands 46 extend outwardly from each of the outer ends of the shell approximately an equal distance. With bundle 26 in place, combination centering and frusto-conical tubesheet forming means, generally designated 48, FIGS. 4 and 9, is moved axially over band means 46 and along fibers 27, with combination means 48 oriented as shown in FIG. 4, for a distance sufficient to position, or snap, the outer axial end surface portions 49 of generally designated centering fingers 50 into juxtaposition with the inner end surface 53 of band means 46. Each of centering fingers 50 includes a radially outwardly extending portion 52 which is joined to a radially inwardly extending portion 54 and each has a width, or circumferential arc, sufficient to cover and contact a plurality of fibers 27 with resilient pressure, or radial compressive force. Combination means 48 is fabricated from a material, for example, polyethylene, polypropylene or the like, of a selected thickness to give fingers 50 deflection resistance sufficient to maintain the outer circular profile generated by the collective exterior wall surfaces of those fibers lying in the outermost annular layer 45 of fibers at the plane of rear surface 53 of band 46 for the entire time period of the centrifugal casting. This profile is maintained the same as the inner circular profile defined by the inner ends 49 of fingers 50 which collectively encircle the periphery of bundle 26 at the plane of the inner surface 53. The reason, or need, for fingers 50 will be explained in further detail in connection with the centrifugal casting step. It should be observed now, however, that means 48 is a discardable element, or means, which functions during centrifugal casting and after exposing the fiber ends by a transverse cut through it and the fibers, it is discarded.

Combination means 48 also includes a radially outwardly extending tapered portion 56 which extends axially inwardly from the juncture 57 with the axial inner ends of portion 52 of fingers 50. The axial length of taper 56 determines the length of the frustum of the cone to be cast thereagainst and thus the length of the frusto-conical portion 30 of tubesheet 28. This length can be varied as necessary for different sizes of the device being made. While the length is not critical, it must be selected so as to enable reduction of the diameter from the rim, or disc, portion 32 of tubesheet 28 to the diameter of the planar surface of the frusto-conical portion 30 at some angle in the range of about 8° to about 32°, and preferably about 15° to about 25°, from a diametrical plane passing vertically through the shell of device 10 when it is oriented vertically. Means 48 includes flange means 58 which begins at the inner axial end of taper 56 and extends radially outwardly and is joined at its outer edge by skirt 62 which extends further axially inwardly. Skirt 60, 62 has an inner diameter substantially the same as the diameter of the outer end surface 64 of the shell, FIG. 5.

Final assembly of combination means 48 over fiber bundle 26 preparatory to centrifugal casting is completed by positioning skirt 60, 62 around outer end surface 64 of the shell to thereby define the desired frusto-conical shaped cavity around fibers 27.

With combination means 48 in place, as described, the centrifugal casting molding assembly is completed by mounting endmold 66 around means 48 such that inner tapered surface 68 of mold 66 lies in surface contact with the outer wall surface of taper 56 of means 48 while flange 58 abuts supporting flange 59 of endmold 66. In this position centering fingers 50 and axially projecting band means 46 lie within the space inside the axial outer end portion 70 of endmold 66. The mold assembly is then positioned in a centrifugal casting apparatus of conventional type, such as that of U.S. Pat. No. 3,442,002, and using the selected castable resin, preferably a polyurethane resin of the type disclosed in U.S. Pat. No. 3,962,094, is appropriately preheated and concurrently fed into both ports 22, 24 while the apparatus is rotating. The resultant centrifugal force drives the castable resin into the cavity defined by the inner surface of wall 64 outwardly from port 24 and by the cone-shaped cavity extending axially outwardly therefrom which is defined by the inner wall of taper 56 of means 48 as above described. The castable resin penetrates the space between fibers 27, wets the outer surfaces thereof and during continued rotation solidifies the axial inner end of the disc 32 and the frusto-conical extension 30 of the resultant tubesheet 28.

Prior to this invention, in the centrifugal casting of tubesheets in such centrifugal casting operations as those disclosed in U.S. Pat. Nos. 3,442,002 and 3,492,698, particularly when employing a centrifugal apparatus which rotates the device in a horizontal plane, it has been observed that as the resin penetrates between the fibers and fills the cavity the penetrating resin tends to float the outer end band means 46 to a position removable from the axis of the rotating device; the undesirable result is that the fibers 27 bend, or migrate as the entire bundle, to an off-axis position. When the casting resin solidifies, the fibers 27 remain fixed in the off axis position and after transverse severing of the resultant tubesheet to expose the open ends of fibers 27 at the outer end planar surface the fibers lie in an off-center position. Rotating the device in a vertical plane, while better than rotating horizontally, does not cure the problem. This off-center location of the fibers in the planar surface of the tube-sheet creates a potential clotting problem during use and possible reuse, and its elimination has long been desired. In accordance with this invention, centrifugal casting in either the vertical or horizontal plane, when employing a wide variety of castable resins including thermosetting and thermoplastic types, produces a tubesheet having the fibers centered relative to the longitudinal axis of the shell so long as centering means 50, or its eqivalent, is in place surrounding the fiber bundle during centrifugal casting. The resulting improvement in the precision of uniformity of fiber distribution, and the precision of the axial centering of the fibers when using the method of this invention is particularly beneficial in the new frusto-conical shaped tubesheet which is produced thereby.

Centering means 50, and the pressure on the outer layers of fibers by surfaces 49, insures that fibers 27 generally follow the taper of the cone, or outer surface of the frusto-conical portion 30 of tubesheet 28. This fiber orientation results from the gathering and binding of all of the fibers within the profile defined by the peripheral edges 49 of all of fingers 50 at the planar inner surface 53, particularly due to locating the transverse cut through fiber bundle 26 inwardly from planar surface 53 to planar surface 34, FIG. 4. The preferred location of the transverse cut is along, or near, a transverse plane located at the juncture 57 of the axially outward end of taper 56 and axial inner ends of portion 52 of fingers 50. When the cut is located along this plane, fibers 27 present uniformly spaced open ends which extend entirely, or substantially entirely, to the peripheral edge juncture 72 of the conical wall surface and the planar outer end face 34 of the frusto-conical tubesheet 28.

After the transverse cut is completed, the resultant device 10 includes the spaced apart combination disc-frusto-conical shaped tubesheets 28 at either end of the elongated shell. Normally tubesheets 28 form fluid-tight seals between the outer surface of the rim portion and inner surface such as indicated at 74 of outer end wall 64 by virtue of the adhesion between the materials used in making the shell and tubesheets 28.

The improved device incorporating the new tubesheets 28 in the new double-sealed, non-dissassembleable device 10, and the manner of effecting double sealing will now be further described with particular reference to FIGS. 5-9.

Blood chamber means, or header 44 in shown in assembled relationship to tubesheet 28 in FIG. 5 and enlarged in FIG. 6. Header 44 has a stepped funnel shape and comprises a tubular blood port 16, which is illustrated in FIG. 7 with a smooth outer connecting surface which may be slightly tapered, if desired. A first tapered portion 78 is integral with blood port 16 and extends axially inward and radially outwardly therefrom. The angle which taper 78 makes relative to the vertical axis of the shell when the header is assembled as in FIG. 5 and the shell is oriented vertically is not critical; such angle may vary from about 30° to about 90° and preferably varies between about 50° and about 80°. At its inner extremity first tapered portion 78 joins a second tapered portion 80. Portion 80 extends axially inwardly and radially outwardly from portion 78 at a steeper angle of about 8° to about 32° from a vertical plane passing through the axis of header 44 and the shell when oriented vertically. The angle selected for portion 80, and the taper on the frusto-conical outer surface 30 should be the same, or within a degree or less.

Prior to final assembly header taper 80 may vary from the angle of conical surface 30 but upon assembly the mating surfaces assume the same angle and an elongated seal surface 81 is formed. This seal insures a proper fit at juncture 72 to avoid crushing the delicate fibers 27 immediately adjacent to the inner surface 80 while concurrently precluding space for blood entrapment at the sealing surfaces. As shown in FIG. 5 the elongated sealing surface 81 is about one half of the length of the second taper 80 of header 44 but it will be understood that the length of sealing engagement may vary, and normally will vary as a function of location of the transverse cut after centrifugal casting.

Second taper portion 80 of header 44 terminates at its inner end in a radially extending flange 82 which is joined to an axially inwardly extending skirt 84. The outer surface of skirt 84 tapers slightly outwardly in the range of about 2° to about 10° and preferably about 5° from a vertical axial plane when the header and the shell are oriented vertically. The inner surface of skirt 84 is provided with an inwardly projecting circumferentially extending ledge, or bead, 86.

When header 44 is assembled so as to overlie tubesheet 28 and the shell, a second or back up seal is achieved. The outer end wall of the shell comprises on its outer surface an axially elongated disc portion 64 which terminates in a tapered portion 88. Taper 88 extends axially inwardly from the outer end surface 90 of the shell and slightly radially outwardly from surface 90, for example, about 5° to about 15° from a vertical, axial plane when the shell is oriented vertically. Bead 86 is forced axially along taper 88 as header 44 is moved to its assembled location, as shown in FIGS. 5 and 6 and is compressed against that surface sufficiently to form an air-tight seal even when the internal pressure in dialysate chamber 12 is operating at its extreme of negative, or below atmospheric, pressure of up to about negative 700 millimeters of mercury. This air-tight seal prevents air ingress when, or if, the seal fails between disc 32 and the inner wall surface of the shell adjacent its outer end and typified by location 74.

As seen in FIG. 3, completion of assembly of the shell, tubesheet 28 and header 44 further requires that slip ring means, generally designated, 92 be placed over header 44 and the outer end wall portion 64 of the shell to the positions shown in FIGS. 5 and 6. Slip ring 92 is an annulus having an inner end opening 94 defined by an axially elongated surface 96. Slip ring 92 is provided at its outer end with an outer end opening 97 which is somewhat smaller than opening 94 and provided adjacent thereto with an inwardly projecting undercut ledge 98 adapted for snap-in engagement and locking in place of a sterility maintaining cap means 18, when optionally used. A second, undercut, enlarged pressure ledge 100 is provided between ledge 98 and surface 96. Ledge 100 functions to apply pressure on radially extending ledge 82 of header 44 to move header 44 axially inwardly as slip ring 92 is moved toward its final assembly position, as shown. Additionally slip ring 92 applies radial pressure on skirt 84 and compressive force on bead 86 sufficient to distort or flatten bead 86 against tapered surface 88.

The double seal assembly as above described is converted into a permanent, non-disassembleable unit by any suitable means such as heat sealing the header to the shell with optional heat sealing of ring 92 to the header and/or the shell, or by adhesive bonding or preferably by ultrasonic welding. Slip ring 92 is adapted for ultrasonic welding directly to shell wall 64 in the following manner. Inner wall surface 96 is slightly tapered radially outwardly and axially inwardly from a location spaced slightly inwardly of ledge 98, for example about 3° to 10°. Surface 96 is provided with a plurality of inwardly projecting, circumferentially spaced tabs, or weldments, 102. Tabs 102 increase in radial thickness and increase in arcuate, or circumferential width, as they extend axially inwardly. The axially inner, or top surface, of tabs 102 are parallel to the longitudinal axis of ring 92 and of device 10 when it is in assembled position; the diameter of the top surface of tabs 102 is slightly smaller than the outside diameter of shell wall 64 and selected such that a slight pressure interference occurs between tabs 102 and wall 64 as slip ring 92 is moved into its final assembled position shown in FIG. 6. Ultrasonic welding of tabs 102 to shell wall surface 64 is effected while slip ring is maintained under sufficient pressure exerted axially inwardly to thereby permanently join all of the parts into a unit.

Device 10 optionally includes a tamper-proof sterility cap 18, the details of which are shown in FIGS. 10-14. Summarily described cap 18 is a snap-in, detachable, tortuous path cover for the outer end of each of the blood ports and is mounted thereon; detachment of cap 18 requires destruction of collapsible window portions such that removal is visually detectable, thus assuring guarantee of sterility until intentional removal in the clinic prior to use.

Cap 18 has a truncated conical shape which continues and smoothly blends into the external curvature of slip ring 92 and internally fits snugly around the outer wall surface of blood port 16. Axially inwardly projecting tortuous path means, FIGS. 10, 11 includes cap receiving cup wall 104 bearing a plurality tortuous path channels 106 which function to provide a path connecting the outside atmosphere with the interior of device 10 through the blood ports while concurrently insuring bacterial sterility due to plural 180° turns 107 in that path.

Cap 18 is provided with deflectable, or pressure distortable means, FIGS. 13, 14, which include circumferentially spaced sections 110 of outer cap wall 108, which extend about 25° to about 50° at the periphery of wall 108 and are bracketed and weakened by slots 112, as shown. Slots 112 extend axially outwardly from end 110 for a short distance and are circumferentially spaced to define the edges 114 of the distortable sections 110.

In the preferred cap construction, two oppositely disposed sections, 110 are provided and each wall section 110 is provided with radial outwardly extending ledge, or snap-in, portions 116 which extend only between slots 112 and are discontinued around the balance of the inner end wall portions 118 which interconnect the opposite sections 110. The outside diameter of wall 118 is approximately the same as the inner diameter of ledge 98 of slip ring 92 and thus cap 18 easily assembles into ring 92 by slight inward radial deflection of wall section 110 sufficient to permit snap-in ledge 116 to pass inwardly of and to be positioned under ledge 98 when the deflecting pressure is released.

Cap 18 is provided with tamper-proof window means generally designated 120, FIG. 13, at two 180° spaced locations in the upper end portion of wall 108 as shown. Windows 120 comprise two side-by-side panels 122, 124 separated from each other by axially extending slot 126 and from cap wall 108 by axially spaced slots 128, 130, 132 and 134. Panels 122, 124 are preferably made thinner than wall 108 and of easily stretchable rupturable material, for example, low density polyethylene. The panels are thus sufficiently weak to stretch or tear easily or rupture to thereby permit easy access of the thumb and first finger through slot 126 to enable grasping of the upper wall 136 and by pulling axially to separate cap 20 from slip ring 92.

What is claimed is:

1. A separatory device for treating blood comprising a hollow shell elongated axially, said shell having a curvilinear central portion and openings in its opposite outer end portions, each end portion having a larger curvilinear cross section than said central portion, said shell having inlet and outlet ports located adjacent said end portions, a bundle of continuously hollow semipermeable fibers in said shell and extending through said end openings of said shell, said bundle terminating at each end thereof in a solidified castable resin tubesheet joining said fibers to each other, each said tubesheet having an axially extending inner portion sealingly interfitting with said shell within the opening in each outer end portion to thereby define a dialysate chamber between an inner end surface of each said inner portions, each said tubesheet including a frusto-conical portion integral with said inner portion and extending axially outwardly therefrom and terminating in an outer end planar surface exposing the open ends of said fibers therein, the frusto-conical portion of each tubesheet providing a peripheral surface tapering axially outwardly toward the associated end planar surface, and blood chamber means comprising a separate header adjacent and associated with each tubesheet and forming a blood chamber communicating with the outer end planar surface of the adjacent tubesheet, means for effecting an axially elongated fluid seal between each header and adjacent tubesheet entirely around the periphery of each frusto-conical portion comprising an integral tapered portion of the adjacent header coextensive axially with a portion of said axially tapering peripheral surface of the associated frusto-conical portion in pressure sealing engagement therewith, blood chamber sealing means on the peripheral surface of each outer end portion of said shell comprising a tapered portion of the shell extending toward the outer end of said shell in the direction from said central portion axially outwardly and radially inwardly, and means for effecting a gas seal between each header and each said tapered portion respectively of said shell outer end portion entirely around the latter comprising a skirt of each header at the inner end thereof extending around said tapered portion of the associated shell outer end portion in gas tight sealing engagement.

2. A device in accordance with claim 1, said tapered portion of each header terminating axially inwardly in a radial outwardly extending flange of said header, said skirt extending axially inwardly from the radially outer periphery of said flange and having radially inwardly projecting sealing means engaging said tapered portion of said shell in said sealing engagement.

3. A device in accordance with claim 2, each said blood chamber means also comprising a slip ring portion having an inner end opening dimensioned to receive and surround said header at the region of said skirt and to exert radially inwardly directed pressure against said header to assure said fluid seal between said header and frusto-conical portion and said gas seal between said sealing means of said skirt and said tapered portion of said shell outer end portion, said slip ring also having a portion axially abutting said radial flange of said header and exerting axially inwardly directed pressure against said header urging said sealing means of said skirt axially inwardly along said tapered portion of said shell outer end portion and thereby to assure said gas seal, and means securing said slip ring to said outer end portion of said shell.

4. A device in accordance with claim 1, wherein said blood chamber means includes a combination internal and external sealing header portion and a slip ring portion, said header portion being of funnel shape and comprising: a blood port communicating with a first tapered portion, said first tapered portion extending axially inwardly and radially outwardly from said port at an angle of about 30° to about 90° from a vertical plane passing through the diameter of said shell when said shell is oriented vertically, and terminating in a second tapered portion, said second tapered portion extending axially inwardly and radially outwardly at an angle of about 8° to about 32° from a vertical diametrical plane when said shell is oriented vertically and terminating at its inner end in a radially extending flange, said skirt being joined to the outer radial end portion of said flange and extending axially inwardly therefrom and having inwardly projecting sealing means located on the inner wall surface thereof, and said slip ring portion having an inner end opening surrounding said header and the outer end of said shell, said slip ring engaging said header and shell with sufficient pressure to concurrently effect said fluid seal between said header and said frust-conical portion and said gas-tight seal between said skirt and said tapered portion of the outer peripheral surface of said shell.

5. A device in accordance with claim 4, wherein said slip ring is provided with an outer end opening smaller in diameter than said inner end opening, an annular ledge of said slip ring spaced inwardly from said outer end opening and adapted to seat against and support said radially extending flange of said header, and an internal tapered portion of said slip ring extending axially inwardly from said ledge and radially outwardly, means on said internal tapered portion supporting and bearing against the said outer surface of said skirt of said header to thereby compress and sealingly force said inwardly projecting sealing means on the inner wall surface of said skirt into sealing engagement with said tapered portion on the outer peripheral surface adjacent the outer end of said shell, and means joining said slip ring to the outer end of said shell.

6. A device in accordance with claim 4, wherein each said blood port is covered by a sterility maintaining cap means disengageably attached to the outer end portion of said slip ring.

7. A device in accordance with claim 6, comprising interfitting internal means adjacent the outer end opening in said slip ring and attachment means on the inner end of said cap means for effecting the disengageable attachment of said cap means to said slip ring.

8. A medical separatory device comprising a shell having an axially outer end portion defining an opening, a bundle of hollow semipermeable fibers in said shell and extending axially therefrom through said opening and terminating in a solidified castable resin tubesheet joining said fibers to each other, said tubesheet having an inner portion sealingly interfitting with said outer end portion around said opening and terminating axially outwardly in an outer planar end surface exposing the open ends of said fibers therein, blood chamber means comprising a header enclosing said outer end planar surface and having an axially inner portion in pressure exerting sealing engagement with said shell for effecting an air seal therewith entirely around said opening, said tubesheet having a frusto-conical portion integral with and extending axially outwardly from said inner portion thereof and providing a peripheral surface tapering toward said outer planar end surface, means for effecting an axially elongated fluid seal entirely around the periphery of said frusto-conical portion throughout the axial extent of a portion thereof comprising an integral tapered portion of said header coextensive axially with said portion of said peripheral surface in pressure sealing engagement therewith, said axially inner portion of said header comprising a skirt, said air seal comprising an axially inwardly extending sealing portion of said skirt surrounding a radially outer sealing portion of said outer end portion of said shell in said pressure exerting sealing engagement, and means for enhancing the sealing effectiveness of said header comprising a slip ring surrounding said skirt and exerting radially inwardly directed pressure thereto, said sealing portions of said skirt and outer end portion of said shell comprising tapered surface means for increasing said pressure sealing engagement upon axial inward movement of said skirt with respect to said outer end portion of said shell, and means for enhancing the sealing effectiveness of the sealing portions of said header comprising interengaging portions of said slip ring and header for exerting axially inwardly directed force against said header.

9. A device according to claim 8, said air seal comprising an integral sealing projection of said skirt extending radially inwardly from an axially inner portion thereof and surrounding said radially outer sealing portion of said outer end portion of said shell in said pressure exerting sealing engagement.

10. A device according to claim 9, said radially outer sealing portion of said shell surrounded by said sealing projection tapering axially endwise for increasing said pressure exerting sealing engagement upon axial inward movement of said header with respect to said shell.

11. A device according to claim 8, the radially outer fibers in the frusto-conical portion of said tubesheet conforming to the tapered contour of said frusto-conical portion.

12. A separatory device for treating blood comprising a shell having an axially outer end portion defining an opening, a header defining a blood chamber and having a skirt surrounding the radially outer surface of said outer end portion for closing said opening, a bundle of hollow semi-permeable fibers in said shell and extending therefrom through said opening and terminating in a solidified castable tubesheet joining said fibers to each other, said tubesheet having an inner portion in sealing engagement with said outer end portion entirely around said opening and terminating axially outwardly from said an inner portion in an axially outer end surface in communication with said blood chamber and exposing the outer open ends of said fibers to said blood chamber, means for effecting a fluid seal between the interior surface of said header and the periphery of an axially outer portion of said tubesheet entirely around the latter, said skirt and outer end portion having sealing portions in pressure exerting sealing engagement for effecting an air seal between said skirt and outer end portion entirely around the latter, and a slip ring surrounding and pressing said skirt radially inwardly for enhancing said air seal, said sealing portions of said skirt and outer end portion of said shell including tapered surface means for increasing said pressure exerting sealing engagement upon axial inward movement of said skirt with respect to said shell, and means for enhancing said pressure sealing engagement comprising means on said slip ring engaging and urging said header axially inward.

13. A device according to claim 12, said sealing portion of said outer end portion comprising a radially outer sealing surface tapering axially endwise, said sealing portion of said skirt comprising an integral protrusion extending radially inwardly from the axially inner end of said skirt and engaging said endwise tapering radially outer sealing surface entirely around said opening in said pressure exerting sealing engagement.

* * * * *